US012058469B2

(12) United States Patent
Yu et al.

(10) Patent No.: US 12,058,469 B2
(45) Date of Patent: Aug. 6, 2024

(54) AUTOMATIC CINEMATOGRAPHY SYSTEM USING REINFORCEMENT LEARNING

(71) Applicant: TCL RESEARCH AMERICA INC., San Jose, CA (US)

(72) Inventors: Zixiao Yu, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 148 days.

(21) Appl. No.: 17/858,067

(22) Filed: Jul. 6, 2022

(65) Prior Publication Data

US 2024/0015259 A1    Jan. 11, 2024

(51) Int. Cl.
H04N 5/222    (2006.01)
H04N 23/62    (2023.01)

(52) U.S. Cl.
CPC .......... *H04N 5/2228* (2013.01); *H04N 23/62* (2023.01)

(58) Field of Classification Search
CPC ...... H04N 5/2228; H04N 23/62; H04N 23/64; G06F 16/786; G06F 16/738
USPC ....................................................... 386/223
See application file for complete search history.

(56) References Cited

U.S. PATENT DOCUMENTS

2022/0335726 A1* 10/2022 Paverman Kashani ... G06T 7/80

FOREIGN PATENT DOCUMENTS

WO    WO-2009055929 A1 *  5/2009 ............. G03B 35/08

OTHER PUBLICATIONS

English Translation of Chinese Publication CN 111141300 May 2020 (Year: 2020).*
Quentin Galvane. Automatic Cinematography and Editing in Virtual Environments. Graphics. Grenoble 1 UJF—Universit e Joseph Fourier, 2015.
Amaury Louarn, Marc Christie, and Fabrice Lamarche. 2018. Automated Staging for Virtual Cinematography. In Proceedings of MIG '18: Motion, Interaction and Games, Limassol, Cyprus, Nov. 8-10, 2018 (MIG '18), 10 pages.
Zixiao Yu, Enhao Guo, Haohong Wang, Jian Ren Department of ECE, Michigan State University, East Lansing, MI 48824-1226.
G. Mercado, The filmmaker's eye: Learning (and breaking) the rules of cinematic composition. Routledge, 2013.
Hongda Jiang, Bin Wang, Xi Wang, Marc Christie, and Baoquan Chen. 2020. Example-driven Virtual Cinematography by Learning Camera Behaviors.ACM Trans. Graph. 39, 4, Article 45 (Jul. 2020), 14 pages.

(Continued)

*Primary Examiner* — Loi H Tran
(74) *Attorney, Agent, or Firm* — ANOVA LAW GROUP, PLLC

(57) ABSTRACT

A script-to-movie generation method for a computing device includes: obtaining a movie script; generating a list of actions according to the movie script; generating stage performance based on each action in the list of actions; extracting observation information from the stage performance; using a camera agent trained with a reinforcement learning algorithm to select a camera based on the observation information, where the camera includes camera setting that defines a position of the camera with respect to a character for which the camera shoots; using the selected camera to capture a video of the stage performance; and outputting the video.

20 Claims, 4 Drawing Sheets

(56) References Cited

OTHER PUBLICATIONS

M. Gschwindt, E. Camci, R. Bonatti, W. Wang, E. Kayacan, and S. Scherer, "Can a robot become a movie director? learning artistic principles for aerial cinematography," arXiv preprint arXiv:1904.02579, 2019.

Y. Li, "Deep reinforcement learning: An overview," arXiv preprint arXiv:1701.07274, 2017.

H. Subramonyam, W. Li, E. Adar, and M. Dontcheva, "Taketoons: Script-driven performance animation," in Proceedings of the 31st Annual ACM Symposium on User Interface Software and Technology, pp. 663-674, 2018.

L.Sun and H.Wang, "Director-hint based auto-cinematography," in U.S. Pat. No. 11,120,638, 2021.

Mackenzie Leake, Abe Davis, Anh Truong, and Maneesh Agrawala. 2017.Computational Video Editing for Dialogue-Driven Scenes. ACM Trans. Graph. 36, 4, Article 130 (Jul. 2017), 14 pages.

A. Truong, F. Berthouzoz, W. Li, and M. Agrawala, "Quickcut: An interactive tool for editing narrated video," in Proc. 29th Annual Symposium on User Interface Software and Technology, pp. 497-507, 2016.

I. Arev, H. S. Park, Y. Sheikh, J. Hodgins, and A. Shamir, "Automatic editing of footage from multiple social cameras," ACM Transactions on Graphics (TOG), vol. 33, No. 4, pp. 1-11, 2014.

H. Van Hasselt, A. Guez, and D. Silver, "Deep reinforcement learning with double q-learning," in Proceedings of the AAAI conference on artificial intelligence, vol. 30, 2016.

J. Schulman, F. Wolski, P. Dhariwal, A. Radford, and O. Klimov, "Proximal policy optimization algorithms," arXiv preprint arXiv:1707.06347, 2017.

N. Passalis and A. Tefas, "Deep reinforcement learning for controlling frontal person close-up shooting," Neurocomputing, vol. 335, pp. 37-47, 2019.

M. Gardner, J. Grus, M. Neumann, O. Tafjord, P. Dasigi, N. F. Liu, M. Peters, M. Schmitz, and L. S. Zettlemoyer, "AllennIp: A deep semantic natural language processing platform," 2017.

V. Mnih, A. P. Badia, M. Mirza, A. Graves, T. Lillicrap, T. Harley, D. Silver, and K. Kavukcuoglu, "Asynchronous methods for deep reinforcement learning," in International conference on machine learning, pp. 1928-1937, PMLR, 2016.

G. Brockman, V. Cheung, L. Pettersson, J. Schneider, J. Schulman, J. Tang, and W. Zaremba, "Openai gym," arXiv preprint arXiv:1606.01540, 2016.

D. Bordwell, J. Staiger, and K. Thompson, The classical Hollywood cinema: Film style & mode of production to 1960. Columbia University Press, 1985.

Svanera, Michele, et al. "Over-the-shoulder shot detection in art films." 2015 13th International Workshop on Content-Based Multimedia Indexing (CBMI). IEEE, 2015.

\* cited by examiner

AUTOMATIC CINEMATOGRAPHY SYSTEM USING REINFORCEMENT LEARNING

FIELD OF THE DISCLOSURE

The present disclosure relates to the field of computer graphics technologies and, more particularly, relates to a new automatic cinematography system using reinforcement learning.

BACKGROUND

Automatic cinematography has been proven to be a very effectively means for shortening and bringing down cost of a filmmaking process, by incorporating many rules of camera lens into an optimization process. Many well-known directors develop their own style of camera lens language that sometimes breaks conventional rules. It is difficult to integrate these director's styles into the automatic cinematography framework due to two reasons: (1) it is difficult to capture and translate these styles into a library of rules; and (2) data collected from existing films about the director's styles are often insufficient and inaccurate for learning purpose. As a result, films produced by robotic directors based on common lens languages and conventional rules may fail to meet expectation of human film artists.

BRIEF SUMMARY OF THE DISCLOSURE

One aspect of the present disclosure provides a script-to-movie generation method for a computing device. The method includes: obtaining a movie script; generating a list of actions according to the movie script; generating stage performance based on each action in the list of actions; extracting observation information from the stage performance; using a camera agent trained with a reinforcement learning algorithm to select a camera based on the observation information, wherein the camera includes camera setting that defines a position of the camera with respect to a character for which the camera shoots; using the selected camera to capture a video of the stage performance; and outputting the video.

Another aspect of the present disclosure provides a script-to-movie generation system. The system includes a memory storing program instructions and a processor coupled with the memory and configured to execute the program instructions to: obtain a movie script; generate a list of actions according to the movie script; generate stage performance based on each action in the list of actions; extract observation information from the stage performance; use a camera agent trained with a reinforcement learning algorithm to select a camera based on the observation information, wherein the camera includes camera setting that defines a position of the camera with respect to a character for which the camera shoots; use the selected camera to capture a video of the stage performance; and output the video.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
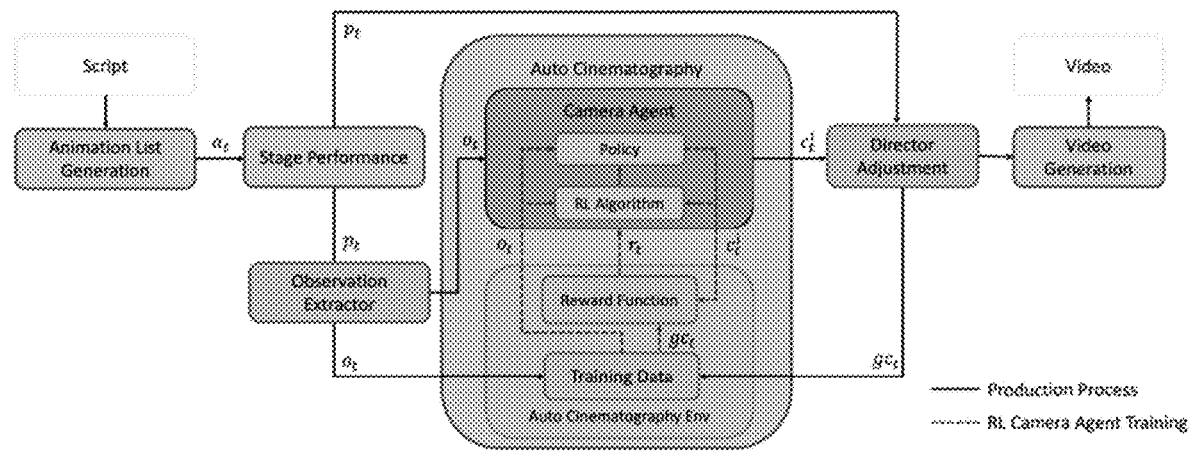
FIG. 1 illustrates a schematic functional diagram of an exemplary script-to-movie generation system according to some embodiments of the present disclosure.

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The write-a-movie technology is an adaptive self-reinforcing movie auto-generation framework, which automatically generates a video from a movie script. The present disclosure provides a script-to-movie generation system that leverages recent advances in natural language processing, computational cinematography, and video understanding. The automatic workflow of the script-to-movie generation system dramatically reduces the time and knowledge required for the script-to-movie generation process. By incorporating a novel hybrid objective evaluation mechanism that considers both the comprehensibility of visual presentation of the movie script and the compliance of cinematography guidelines, the video generation process has been mapped into an optimization problem that aims to produce better quality videos. Dynamic programming has been considered to solve the optimization problem and achieve an optimal solution with the most efficient computation complexity. Thus, the script-to-movie generation system consistent with the present disclosure substantially expedites the movie production process.

In the traditional movie industry, screenplay writing and film making are completely separate processes. With the recent development of artificial intelligence technology, a substantial portion of the film making process can be achieved by computers. Bridging screenplay writing and film making brings immediate benefits to all parties involved. The script writes can visualize their product and edit before submitting. The producers can screen the movie scripts by seeing pre-visualized version instead of reading hundreds of pages of movie scripts. The script-to-movie generation system needs to satisfy two quality requirements. On one hand, the output movie maintains reasonable fidelity of the movie script. On the other hand, the output movie follows cinematic rules with cinematographic aesthetics.

Therefore, a mechanism is needed to evaluate the fidelity of the generated video to the corresponding movie script and pass the feedback to the animation and cinematographic process for further improvement if the evaluated fidelity is below the bar for acceptance. As such, the computational cinematography process needs to consider not only the aesthetics but also the perception from the movie script fidelity perspective. Although the state-of-the-art of today's video understanding capability has not reached the satisfaction for accurately evaluating the fidelity of the generated video to the movie script, it is reasonably sufficient to evaluate certain types of movies, where the scene complexity and activity recognition are less challenging.

The script-to-movie generation system automatically converts a movie script to a movie, such as an animation movie. The script-to-movie generation system includes an arbitration mechanism backed by the video understanding technology that converts the generated video to a list of performed actions and the natural language understanding technology that converts the movie script to a list of intended actions, such that the comprehensibility of the generated video and the fidelity to the movie script can be determined. The evaluation result is then fed back to stage performance to refine the quality of the generated video. Moreover, the aesthetics and the fidelity requirements are combined in a unified evaluation framework and the video quality improvement process is mapped into an optimization problem that adjusts camera setting and character action setting to achieve the desired video quality. The optimization problem is designed such that the it can be solved by dynamic programming to reduce the computation complexity.

However, the movies generated based on the aesthetics and the fidelity requirements have a limited quality as compared to the movies made by human directors. The human directors often break the aesthetics rules while pursuing other aspects of artistry and creativity. Capturing and incorporating behaviors of the human directors into an automatic cinematography system can improve the quality of the movies generated by the automatic cinematography system.

The present disclosure provides a new automatic cinematography system using reinforcement learning. The system is a unified framework for reinforcement learning based text to animation (RT2A) that incorporates reinforcement learning into the automatic cinematography system. In the RT2A framework, human director's decisions on camera lens setting are recorded and utilized for training a machine learning model. The RT2A framework includes a reward functionality to guide an optimization process (i.e., an optimization algorithm) to identify desired rules and mimic the human director's decision-making process for the camera selection of each scene. Experimental results confirm that the RT2A framework can effectively imitate director's use of lens language pattern. When compared to reference algorithms, the RT2A framework achieves a gain of up to 50% in a camera placement acceptance rate, and a gain of up to 80% in imitating a rhythm of camera switching.

Cinematography is an art of choosing camera shot type and angles to capture motion pictures. Camera placement is an effective way to demonstrate artistic charm in film making industry. To apply the cinematography to a content creation process requires lots of training and knowledge. In computer age, people explore the possibility of using robot directors and entrusting the robot directors with this challenging task. This is also known as automatic cinematography. Some successful efforts partially achieve this goal by translating rules from standard cinematography guidelines into a number of cost functions and applying them during the optimization process. Such aesthetic-rule-based robot directors can provide valuable references for entry-level artist without much film experiences. The approach is further improved by replacing the aesthetic model with a hybrid model that also considers a fidelity level of an outputted video by comparing with the textual content in an original script. Mere use of these rules for expression in the film is far from satisfactory. In the film making industry, the human directors are experts in breaking the rules in the cinematography and developing their own unique lens languages to express human creativity and imagination. Therefore, creating the robot directors based on common lens languages and summarized rules is feasible but very hard to achieve a comparable level of human film-making artists.

Neural networks have been explored to extract the lens languages from the existing films to imitate the human director behaviors in the film-making. However, this effort suffered from some problems, for example, data extracted from the existing films is often inaccurate and incomplete because the data is extracted from two-dimensional frames and information in another dimension is lost substantially. Therefore, such approach can only be applied in limited scenarios and is unable to comprehensively imitate the lens language of the human directors. This is a behavioral imitation problem with limited amount of training data and may be achieved by using reinforcement learning (RL) techniques with rewards generated from feedbacks and annotations by the human directors. In order to develop the robot director that can truly learn the lens language of the human directors and to use the learned lens language generally, not only the data needs to be collected precisely during actual cinematography processes, but also the neural network needs to be iteratively improved based on the feedbacks by the human directors.

In the RT2A framework, the human directors make changes to camera settings calculated by the automatic cinematography system. The changes made by the human directors are recorded as training data for a reinforcement learning algorithm of the automatic cinematography system to learn the lens language of the human directors. The lens language of the human directors is captured in the neural network for selecting the camera settings. Each time the human directors make changes to the camera settings, the neural network is iteratively improved through the reinforcement learning algorithm.

In the present disclosure, the reinforcement learning algorithm is used to improve the script-to-movie generation method and system. When the human directors use the script-to-movie generation system to produce films, the data needed for the reinforcement learning algorithm can be collected during the film production process without extra efforts. The T2A film-making framework is reused. A reinforcement learning function module for the automatic cinematography replaces the camera optimization process in T2A. The improved framework is called reinforcement learning based text-to-animation framework (RT2A). The RT2A framework also includes a director feedback function module for the human directors to make changes to or correct the camera placement calculated by a camera agent, which is a function module for calculating the camera setting. The feedbacks or the changes made by the human directors are inputted into the reinforcement learning function module in the camera agent for the camera agent to learn and imitate the lens language of the human directors.

In practical applications, the feedbacks by the human directors can come from stored training data that is collected from the human directors during their routine film-making work using the script-to-movie generation system. With sufficient data and feedbacks, the RT2A framework can effectively learn to support such a robot director that has the potential to replace a real human director and produce animation with the lens language similar to that of the human directors.

The use of the lens language is a crucial factor which determines a quality of a produced film. Using shots going beyond the basic rules requires an acumen artistic sense and extensive knowledge of cinematography. Using the automatic cinematography techniques to reduce the film production cost includes two approaches. One approach is based on the cinematography guidelines. By defining multiple constraints according to various rules and formulating them into the corresponding loss functions, an optimal shot setup for a current scene can be calculated by minimizing a total loss. Different aesthetic constraints can be applied under separate scenarios, such as a dialogue scene, a cooking scene, and an outdoor activity. However, it is difficult to judge whether the use of the lens language is sufficient if only using the aesthetic model. The fidelity model takes consideration of an original script in the optimization process and makes sure that the produced film is consistent with the original script. The rule based approach makes sure that the produced films follow the pre-established constraints and ensures no rule breaking occurs. However, the freedom and creativity from the artists are substantially limited.

Another approach is based on a behavior model of the camera settings extracted from the existing films. This approach is data driven rather than rule driven. There is no need to create rules or constraints to formulate a camera agent. Instead, the camera agent is obtained through the reinforcement learning algorithm, for example, a deep Q-learning (DQN) algorithm, a trust region method (TRPO) algorithm, and a policy optimization (PPO) algorithm. Once sufficiently trained, the camera agent can achieve a desired performance. Thus, accurate and extensive training data needs to be collected.

FIG. 1 illustrates a schematic functional diagram of an exemplary script-to-movie generation system according to some embodiments of the present disclosure. As shown in FIG. 1, the system includes an action list generation module, a stage performance module, an observation extractor module, an automatic cinematography module, a director adjustment module, and a video generation module. The action list generation module takes a textual script as an input, performs a natural language processing (NLP) to analyze the textual script, and generates a corresponding action list. The automatic cinematography module further includes a policy sub-module, an RL algorithm sub-module, a reward function sub-module, and a training data sub-module. The policy sub-module and the RL algorithm sub-module together are also called a camera agent. The reward function sub-module and the training data sub-module together are also called an automatic cinematography environment.

The action list is a chronological list of action objects ($a_t$), which can be considered as a special format to represent contents of the textual script. Each $a_t$ contains necessary information for one or more virtual characters to make a corresponding performance $p_t$ in the stage performance module. A story of the textual script can be performed in the stage performance module with a sequence of performances $p_t$ that follow the order in the action list. At this point, the one or more virtual characters appearing in a scene are bound with multiple cameras and each camera can be identified by a unique index. The frames captured by the cameras become a part of the $p_t$. The observation extractor module takes the $p_t$ to generate a corresponding observation $o_t$ that is defined in the automatic cinematography environment for the camera agent to select a camera $c^i_t$ (i.e., a camera placement), where i is the index of the camera. In case there is insufficient training data initially, a quality of $c^i_t$ computed by the camera agent in the automatic cinematography module is low, and requires manual adjustment of $c^i_t$ by a human director or a user to ensure the quality of a produced video. An adjustment process is conducted in the director adjustment module. The revised $c^i_t$ is annotated as a ground truth camera $gc_t$ and is added into training data together with the corresponding $o_t$. The $p_t$ and $gc_t$ can be used by the video generation module to generate the video. As the number of high-quality videos generated with the RT2A framework grows, a size of the training data grows as well. When sufficient training data is accumulated, the automatic cinematography module is able to properly train the camera agent and update the policy with the RL algorithm. Thus, a workload for the human director or the user to adjust the camera placement is significantly reduced once the camera agent is trained with sufficient training data.

As shown in FIG. 1, the automatic cinematography module is configured to train the camera agent. The observation generator module uses the training data to generate the observation $o_t$ at times t. The camera agent processes the observation $o_t$ to select the camera $c^i_t$. The reward function sub-module calculates a reward $r_t$ by comparing the camera $c^i_t$ selected by the camera agent and the camera $gc_t$ selected by the human director. The reward $r_t$ is used to update the camera agent, for example, the policy sub-module by the RL algorithm sub-module.

In the automatic cinematography environment, the observation $o_t$ at time t includes information needed by the camera agent to select the camera $c^i_t$ based on the policy. The observation $o_t$ includes character visibility, camera configuration, left-to-right order (LRO), action type, action start time and duration, dialogue start time and duration, or a combination thereof.

The character visibility is determined by a size of each character in the frame as compared to a total frame size, weights for different characters, and camera combinations. Because more than one camera is bounded to each character, some cameras may be blocked by obstacles and certain characters may be obscured from views of some cameras.

When switching the cameras, a configuration of a previously selected camera may affect selecting a subsequent camera. For example, a shot-reverse shot rule is commonly used in a dialogue scene. In this case, the configuration of the previously selected camera needs to be included in the observation $o_t$.

The LRO is a rule for showing a positional relationship of two or more characters in the frame. The positional relationship of the two or more characters in the frame is included to enforce a 180-degree rule in the film-making industry. However, the LROs at t taken by different cameras may not be the same.

The action type is a type of a character action. For example, the action type can be standby, which does not affect the camera selection. In another example, the action type is facial, which does affect the camera selection. In this case, it is likely to select the camera for a close shot at a character face. In the present disclosure, the action type includes character movements, such as facial, upper limb, lower limb, whole body, and standby.

The action start time and the duration of the action may affect the camera selection. Generally, transition of a camera shot $c_i$ occurs at the beginning of the action. The action with a long action duration (e.g., more than 10 seconds) requires a combination of different camera shots. In other words, a plurality of cameras need to be selected in a sequence.

The dialogue start time and the duration of the dialogue may affect the camera selection. The action in a dialogue scene needs special treatment. In a long dialogue scene, a camera angle needs to be switched back and forth between interlocutors of the dialogue, and an over-the-shoulder camera shot is often used in the dialogue scene.

In the automatic cinematography environment, each camera includes camera setting that defines a position of the camera with respect to a corresponding character that the camera shoots for. A plurality of default cameras are placed at different distances and angles to shoot the characters. The plurality of default cameras cover most of the camera placements required by the cinematography guideline and each default camera is given a unique index that can be selected by the camera agent. The camera setting further includes: a shot type d(c) representing a distance between the camera and the corresponding character, a pan angle h(c) of the camera, and a pitch angle of the camera.

The shot type d(c) is selected from extreme close shot (ECU), close shot (CU), median shot (MS), full body shot (FS) and long shot (LS), and is quantified to numeric representation from 0 to 4, respectively. When calculating a difference between two camera settings, the numbers corresponding to the distances are subtracted. The pan angle h(c) of the camera is in a range of 0° to 360°. The pitch p(c) of the camera is in a range of −15° to +15°.

In the automatic cinematography environment, the reward function is determined based on a difference between the camera setting of the camera $c^i_t$ selected by the camera agent and the camera setting of the camera $gc_t$ selected by the human director. The smaller difference, the more similar the camera settings, and the higher reward $r_t$.

The reward function for the shot type d(c) is defined as:

$$r_t^d = \begin{cases} 1 & \text{if } d(c_t^i) = d(gc_t) \\ 1 - \frac{|d(c_t^i) - d(gc_t)|}{4} & \text{otherwise} \end{cases} \quad (1)$$

The reward function for the pan angle of the camera is defined as:

$$r_t^h = \begin{cases} 1 & \text{if } h(c_t^i) = h(gc_t) \\ 1 - \frac{|h(c_t^i) - h(gc_t)|}{30} & \text{otherwise} \end{cases} \quad (2)$$

The reward function for the pitch angle of the camera is defined as:

$$r_t^p = \begin{cases} 1 & \text{if } p(c_t^i) = p(gc_t) \\ 1 - \frac{|p(c_t^i) - p(gc_t)|}{180} & \text{otherwise} \end{cases} \quad (3)$$

When the difference between the selected camera and the ground truth is less than a predefined threshold δ, an extra reward is added to expedite a learning process. The larger the δ, the larger the deviation between $c_t^i$ and $gc_t$ that can be tolerated. The extra reward function is defined as:

$$r_t^\delta = \begin{cases} 1 & \text{if } \frac{|d(c_t^i) - d(gc_t)|}{4} + \frac{|h(c_t^i) - h(gc_t)|}{30} + \frac{|p(c_t^i) - p(gc_t)|}{180} < \delta \\ 0 & \text{otherwise} \end{cases} \quad (4)$$

The overall reward function is defined as the sum of all the previous rewards:

$$r_t = r_t^d + r_t^h + r_t^p + r_t. \quad (5)$$

The camera agent starts with the observation $o_0$, selects the camera according to the policy π(o), and maximizes the reward R.

The R for an episode with T steps is defined as:

$$\mathcal{R} = \sum_0^T \gamma^{t-1} r_t \quad t = 0, 1, \cdots, T \quad (6)$$

where $r_t$ is the reward at time t, γ is a discount factor that defines an importance of the reward $r_t$ versus future rewards, and 0≤γ≤1. The higher the γ value, the more important the future rewards.

An objective of the RL algorithm is to find an optimal it that maximizes R. The optimal π* is defined as:

$$\pi^* = \text{argmax } \mathbb{E}(R|\pi). \quad (7)$$

where E represents the episode.

The process is accomplished by iteratively updating parameters of the policy go according to a loss function that measures an error between the reward calculated by a current policy $\pi_{current}$ and the reward calculated by a previous policy void $\pi_{old}$. A proximal policy optimization (PPO) algorithm, which is a variation of an advantage actor-critic (A2C) algorithm, is used to solve the problem in equation (7). The PPO algorithm combines policy-based and value-based RL algorithms together. An actor neural network model takes a state (or an observation) and outputs an action according to the policy π( ) A critic neural network model maps each state to a corresponding quality value of the state (i.e., an expected future cumulative discounted return). An advantage $\mathcal{A}$ (or discounted return) is used to indicate how good is the camera selection compared to an average camera selection for a specific observation. The advantage $\mathcal{A}$ at time t is defined as:

$$\mathcal{A} = -V(o_t) + rt_t + \gamma_{t+1} + \ldots + \gamma^{T-t+1} rt_{T-1} + \gamma^{T-t} V(o_t). \quad (8)$$

where V is a learned state-value function, and $rt_t$ is a parameter changing ratio between the policy $\pi_{current}$ and the policy $\pi_{old}$ at step t.

During the training process, the PPO algorithm updates the parameters of both the actor neural network and the critic neural network through back-propagation using two loss functions. Each iteration of updating the policy π is to maximize an overall return (i.e., max|$Z_t$(rt, $\mathcal{A}$)|). However, changing the policy $\pi_\theta$ needs to be avoided in a single update.

The actor loss function $L_{actor}$ is defined as:

$$L_{actor}(\theta) = \min(rt(\theta) \mathcal{A}_t, \text{clip}(rt(\theta), 1-\epsilon, 1+\epsilon) \mathcal{A}_t). \quad (9)$$

where clip(•) modifies a surrogate objective by clipping a probability ratio, which removes an incentive for moving rt outside of the interval [1−ϵ, 1+ϵ] Regardless of a value of positive feedback gained according to the camera selection $c_t^i$, the PPO algorithm updates the policy only based on the result within the interval. Thus, it is able to incrementally update the policy go with desired parameters. However, a penalty based on the negative reward has no limitation.

The critic loss function $L_{critic}$ is defined as:

$$\mathcal{L}_{critic} = \frac{1}{2}\mathcal{A}^2. \tag{10}$$

Figure 2:
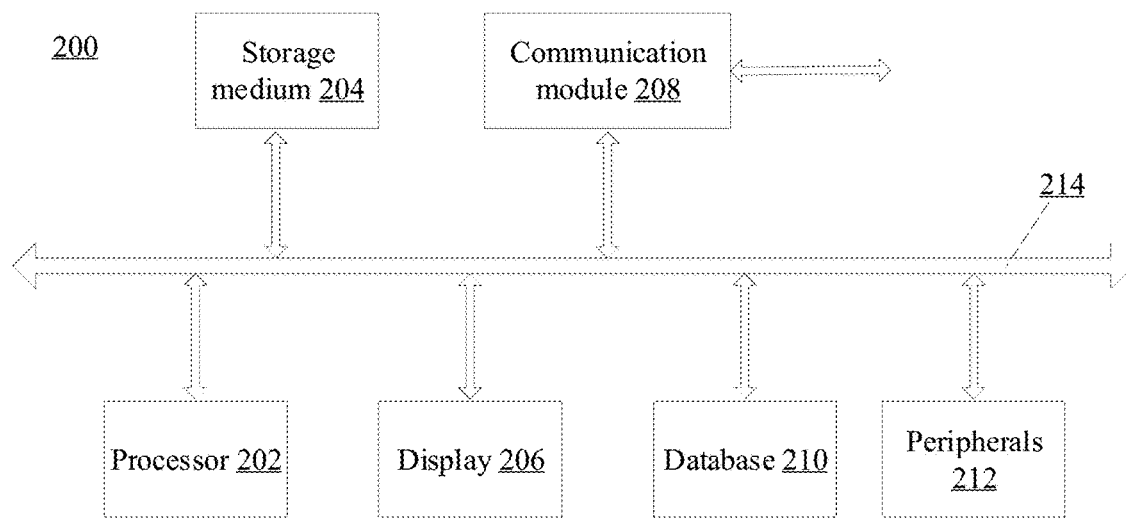
FIG. 2 illustrates a schematic structural diagram of an exemplary script-to-movie generation system according to some embodiments of the present disclosure.

The present disclosure provides a script-to-movie generation system. FIG. 2 illustrates a schematic structural diagram of an exemplary script-to-movie generation system according to some embodiments of the present disclosure. As shown in FIG. 2, the computing device 200 may include a processor 202, a storage medium 204, a display 206, a communication module 208, a database 210, and peripherals 212, and one or more bus 214 to couple the devices together. Certain devices may be omitted and other devices may be included.

The processor 202 may include any appropriate processor or processors. Further, the processor 202 can include multiple cores for multi-thread or parallel processing. The processor 202 may execute sequences of computer program instructions or program modules to perform various processes, such as requesting user input of directorial hints on a graphical user interface, generating/rendering an animated video, translating directorial hints for editing optimization of the animated video, etc. The storage medium 204 may include memory modules, such as ROM, RAM, flash memory modules, and erasable and rewritable memory, and mass storages, such as CD-ROM, U-disk, and hard disk, etc. The storage medium 204 may store computer program instructions or program modules for implementing various processes, when executed by the processor 202.

Further, the communication module 208 may include network devices for establishing connections through a communication network. The database 210 may include one or more databases for storing certain data (e.g., images, videos, animation materials) and for performing certain operations on the stored data, such as database searching and data retrieving.

The display 206 may include any appropriate type of computer display device or electronic device display (e.g., CRT or LCD based devices, touch screens, LED display). The peripherals 212 may include various sensors and other I/O devices, such as speaker, camera, motion sensors, keyboard, mouse, etc.

In operation, the computing device 200 can perform a series of actions to implement the disclosed auto-cinematography method and framework. The computing device 200 can implement a terminal or a server, or a combination of both. A terminal, as used herein, may refer to any appropriate user terminal with certain computing capabilities including, e.g., collecting user-entered directorial hints, displaying preview videos, performing editing optimization on a video. For example, a terminal can be a personal computer (PC), a workstation computer, a server computer, a hand-held computing device (tablet), a mobile terminal (a mobile phone or a smartphone), or any other user-side computing device. A server, as used herein, may refer to one or more server computers configured to provide certain server functionalities, such as determining camera configurations for shooting an animated video, generating the animated video based on the camera configurations, editing the animated video by finding a path with minimum cost function in a graph model.

The server may also include one or more processors to execute computer programs in parallel. The terminal and/or the server may be configured to provide structures and functions for such actions and operations. In some embodiments, some part of the actions may be performed on the server, and other part of the actions may be performed on the terminal.

Figure 3:
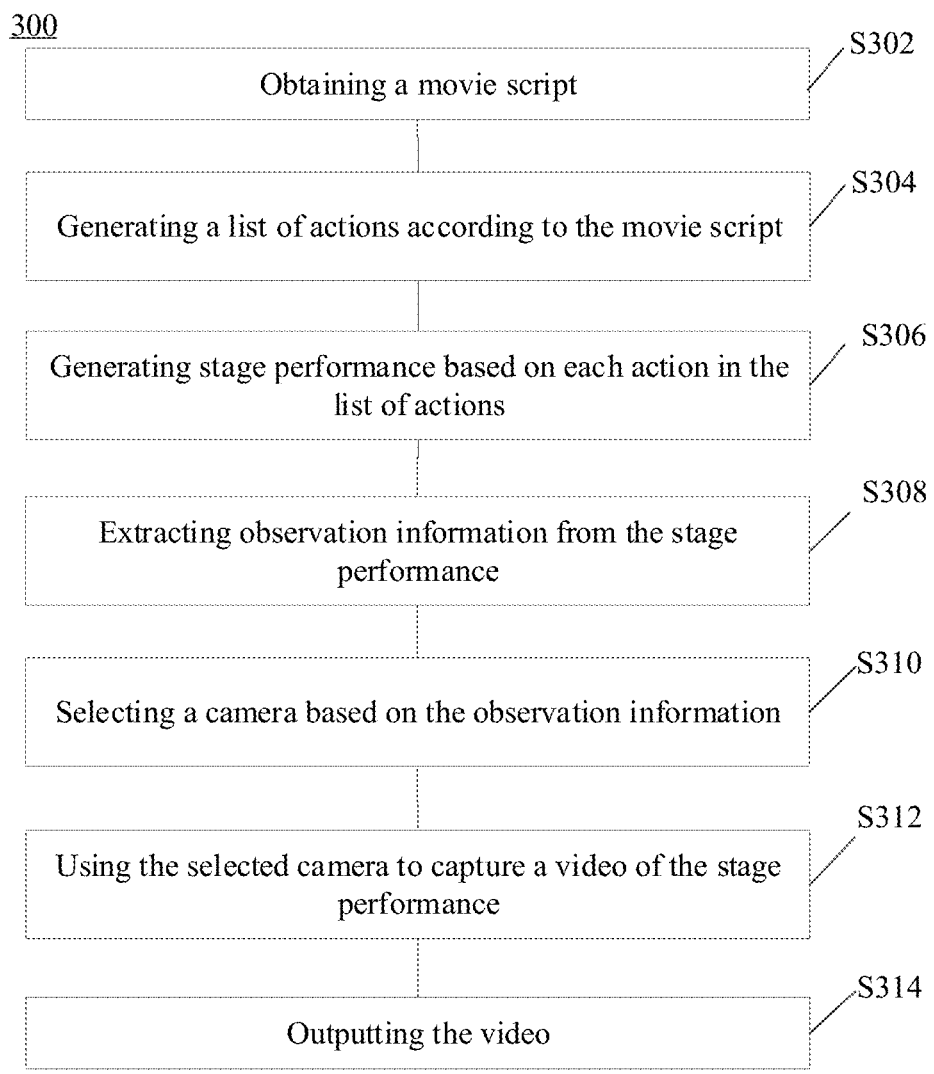
FIG. 3 illustrates a flowchart of an exemplary script-to-movie generation method according to some embodiments of the present disclosure.

The present disclosure also provides a script-to-movie generation method. FIG. 3 illustrates a flowchart of an exemplary script-to-movie generation method according to some embodiments of the present disclosure. The method may be implemented by a computing device, such as the device 200 shown in FIG. 2. As shown in FIG. 3, the method includes the following processes.

At S302, a movie script is obtained.

Specifically, the movie script is a textual script used to generate a video corresponding to the movie script.

At S304, a list of actions is generated according to the movie script.

In some embodiments, a natural language processing (NLP) is performed to analyze the movie script and generate the list of actions. The list of actions is a chronological action list including the actions intended to show visual presentation of the movie script.

At S306, stage performance is generated based on each action in the list of actions.

In some embodiments, the stage performance represented by $\{p_t|t=1, 2, \ldots, T\}$ is generated based on each action in the action list, where $p_t$ is the stage performance by a character at time t and T is a total performance time. In some embodiments, the stage performance corresponding to each action $a_t$ is represented by $$\left\{p_{t_{a_i}}, \ldots, p_{t+1_{a_i}}, \ldots, p_{t+l_{a_{i_{a_i}}}}\right\},$$

where $l_{a_i}$ is the action duration of $a_i$, and $t_{a_i}$ and $l_{a_i}$ are fixed values derived from the action list.

In some embodiments, one or more cameras capture a candidate video $\{f_t|t=1, 2, \ldots, T\}$ from the stage performance $\{p_t|t=1, 2, \ldots, T\}$. The one or more cameras are tactically deployed and bounded to each character in the stage performance.

At S308, observation information is extracted from the stage performance.

In some embodiments, the observation information includes one or more of character visibility, camera configuration, left to right order (LRO), action type, action start time and duration, dialogue start time and duration, or a combination thereof. In the specification, the observation information and the observation are used interchangeably.

The character visibility is determined by a size of each character in the frame as compared to a total frame size, weights for different characters, and camera combinations. Because more than one camera is bounded to each character, some cameras may be blocked by obstacles and certain characters may be obscured from views of some cameras.

When switching the cameras, a configuration of a previously selected camera may affect selecting a subsequent camera. For example, a shot-reverse shot rule is commonly used in a dialogue scene. In this case, the configuration of the previously selected camera needs to be included in the observation $o_t$.

The LRO is a rule for showing a positional relationship of two or more characters in the frame. The positional relationship of the two or more characters in the frame is included to enforce a 180-degree rule in the film-making industry. However, the LROs at t taken by different cameras may not be the same.

The action type is a type of a character action. For example, the action type can be standby, which does not affect the camera selection. In another example, the action type is facial, which does affect the camera selection. In this case, it is likely to select the camera for a close shot at a character face. In the present disclosure, the action type includes character movements, such as facial, upper limb, lower limb, whole body, and standby.

The action start time and the duration of the action may affect the camera selection. Generally, transition of a camera shot $c_i$ occurs at the beginning of the action. The action with a long action duration (e.g., more than 10 seconds) requires a combination of different camera shots. In other words, a plurality of cameras need to be selected in a sequence.

The dialogue start time and the duration of the dialogue may affect the camera selection. The action in a dialogue scene needs special treatment. In a long dialogue scene, a camera angle needs to be switched back and forth between interlocutors of the dialogue, and an over-the-shoulder camera shot is often used in the dialogue scene.

At S310, a camera agent trained with the reinforcement learning algorithm is used to select a camera based on the observation information.

In some embodiments, the camera selected includes camera setting that defines a position of the camera with respect to a character for which the camera shoots. Selecting a camera may include determining camera settings for one or more cameras used in one or more scenes and/or one or more episodes as needed. When selecting the camera based on the observation information, a camera agent is used to select the camera based on the observation information and a policy for camera selection. The policy for camera selection is initially pre-configured and is iteratively updated by the reinforcement learning algorithm.

In some embodiments, after the camera is selected, the method further includes evaluating quality of the selected camera, in response to the quality of the selected camera being lower than or equal to a pre-configured threshold, changing the selected camera according to a camera selection input entered by a human director or a user through a human director interface or a graphical user interface, and using the changed camera as ground truth data to train the camera agent and update the policy for camera selection.

In some embodiments, when the policy for camera selection is updated, the method uses a reward function to calculate a reward based on the selected camera and the changed camera, and uses the reward to update the policy for camera selection.

In some embodiments, the camera setting of the camera includes: a shot type d(c) representing a distance between the camera and a shooting character, where d(c)∈[0, 1, 2, 3, 4] representing extreme close shot, close shot, median shot, full body shot, and long shot, h(c), indicating a pan angle ranging from 0° to 360°, and p(c), indicating a pitch angle ranging from −15° to 15°.

In some embodiments, the reward function includes a reward function for the shot type, a reward function for the pan angle, a reward function for the pitch angle, and an extra reward. The reward function for the shot type is $$r_t^d = \begin{cases} 1 & \text{if } d(c_t^i) = d(gc_t) \\ 1 - \frac{|d(c_t^i) - d(gc_t)|}{4} & \text{otherwise} \end{cases}.$$

The reward function for the pan angle is $$r_t^h = \begin{cases} 1 & \text{if } h(c_t^i) = h(gc_t) \\ 1 - \frac{|h(c_t^i) - h(gc_t)|}{30} & \text{otherwise} \end{cases}.$$

The reward function for the pitch angle is $$r_t^p = \begin{cases} 1 & \text{if } p(c_t^i) = p(gc_t) \\ 1 - \frac{|p(c_t^i) - p(gc_t)|}{180} & \text{otherwise} \end{cases}.$$

The extra reward is $$r_t^\delta = \begin{cases} 1 & \text{if } \frac{|d(c_t^i) - d(gc_t)|}{4} + \frac{|h(c_t^i) - h(gc_t)|}{30} + \frac{|p(c_t^i) - p(gc_t)|}{180} < \delta \\ 0 & \text{otherwise} \end{cases}.$$

$c_t^i$ is the selected camera at a time t, i is an index of the camera, $gc_t$ is the changed camera at the time t, and δ is the pre-configured threshold.

In some embodiments, the reward for an episode with T steps $$\mathcal{R} = \sum_0^T \gamma^{t-1} r_t \quad t = 0, 1, \cdots, T,$$

where $r_t$ is the reward at time t, γ is a discount factor that defines importance of the reward $r_t$ versus a future reward, and 1≤γ≤1.

In some embodiments, the method further includes: finding an optimal policy for camera selection π* that maximizes the reward R for the episode with T steps: π*=argmax E(R|π), where π is the policy for camera selection.

In some embodiments, finding the optimal policy for camera selection π* includes iteratively updating parameters of the policy for camera selection π according to a loss function L that measures an error between a reward estimation calculated by using a current policy for camera selection $\pi_{current}$ and a previous policy for camera selection $\pi_{previous}$ by using a proximal policy optimization (PPO) algorithm.

In some embodiments, an improvement between the current policy for camera selection $\pi_{current}$ and the previous policy for camera selection $\pi_{previous}$ is evaluated by calculating an advantage at time t: $\hat{A} = -V(o_t) + rt_t + \gamma_{t+1} + \ldots + \gamma^{T-t+1}$, $rt_{T-1} + \gamma^{T-1} V(o_t)$, where V is a learned state-value function, $o_t$ is the observation information at time t, and $rt_t$ is a parameter changing ratio between the current policy for camera selection $\pi_{current}$ and the previous policy for camera selection $\pi_{previous}$ at time t.

In some embodiments, the PPO algorithm updates parameters of both actor and critic neural networks through back-propagation according to two loss functions below:

$$L_{actor}(\theta) = \min(rt(\theta)\hat{A}_t, clip(rt(\theta), 1-\epsilon, 1+\epsilon)\hat{A}_t) \text{ and } L_{critic} = \frac{1}{2}\hat{A}^2,$$

where θ indicates whether it is the current policy for camera selection or the previous policy for camera selection, clip(•)

modifies a surrogate objective by clipping a probability ratio which removes an incentive for moving $r_t$ outside of an interval $[1-\in, 1+\in]$.

At S312, the selected camera is used to capture a video of the stage performance.

In some embodiments, the selected camera can be the camera selected by the camera agent or by the human director or the user through the human director interface or the graphical user interface. The selected camera is used to capture the video of the stage performance.

At S314, the video is outputted.

In some embodiments, the video capturing the stage performance is outputted. The videos for the stage performances of the list of actions generated according to the movie script are combined to become a movie.

In the embodiments of the present disclosure, the behavior of the human director who uses the automatic cinematography system is captured to train the camera agent. After the camera agent is trained by sufficient amount of training data through the reinforcement learning algorithm, the camera agent is able to select the camera similar to the human director and improves the quality of the produced movie as compared to the methods only based on the aesthetic model and fidelity model.

Examples are provided below to describe the advantages of the RT2A framework.

In some embodiments, experiment setup and the performance details of the disclosed RL automatic cinematography method are demonstrated. The automatic cinematography environment and the camera agent are implemented using OpenAI Gym. It takes about 38 hours to finish the training process based on the NVIDIA GTX 2080 TI GPU. To evaluate the advantage of the RL automatic cinematography model, the RT2A method, the aesthetic model method, and the aesthetic model+fidelity model method are compared. The performance is evaluated from two aspects: 1) comparing the camera placement generated by the RT2A camera agent and by the reference algorithms; 2) comparing the visual quality of videos produced by the RT2A and reference algorithms.

Figure 4:
FIG. 4 illustrates exemplary frames generated by different models.
Figure 5:
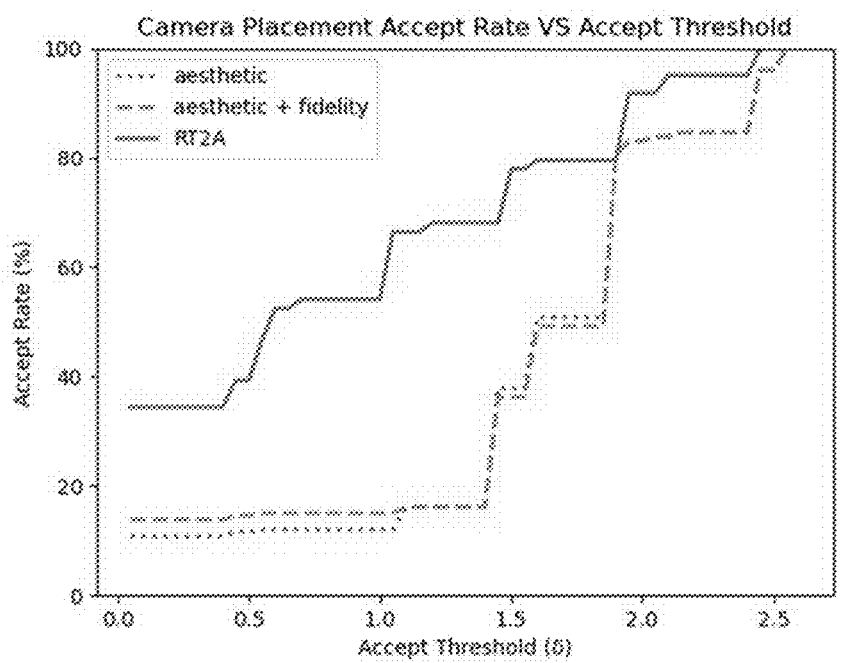
FIG. 5 illustrates a schematic diagram of camera placement acceptance rate versus acceptance threshold according to some embodiments of the present disclosure.

Difference in camera placement in the experimental environment is shown by sampling the cameras generated by different methods at every second. By comparing the physical distance between the camera placement of each algorithm with the ground truth (placement manually entered by the human director), and defining a number of acceptance thresholds (that is, the placement is accepted if the physical distance is less than the acceptance threshold), the performance of the algorithms can be measured by the percentage of cameras being accepted, which is called acceptance rate. The calculation of the physical distance is based on the equation (1), the equation (2), and the equation (3). The results are shown in FIG. 5. The RT2A algorithm consistently outperforms the reference algorithms, and the gain in the acceptance rate is substantial. As shown in FIG. 4, the visual comparison of the generated frames from various algorithms indicates that the RT2A algorithm has is more similar to the camera selected by the human director than the reference algorithms. Thus, the RT2A algorithm is able to effectively imitate the behavior of the human director's camera selection model after the camera agent is trained by sufficient amount of the training data.

A complete shot is a continuous view through a single camera without interruption. The number of shots (i.e., average shot duration) used in a single scene is also an important indicator to reflect the shooting style of the director. Table. 1 below shows the number of shots of the RT2A automatic cinematography approach compared to the reference methods in a number of different scenes selected from a test data set. The results indicate that the number of shots used in each of the test scenes by the RT2A method is closer to the ground truth than the reference methods. Visual results also support the conclusion when the frames generated from the aesthetic model method is compared to the frames generated from the RT2A method. Although it is possible for the rule-based method such as the aesthetic model method to mimic the human director by configuring a number of rules to optimize, when compared to the RT2A method, the challenges in adjusting the weights for various parameters and cost functions are much more complicated.

Table 1 below shows the difference in the number of shots of the RT2A method and the reference methods compared with the human director's selected camera placement. The results show the number of shots (also the differences in percentage compared with the selected shots by the human director) used by different methods in a single scene.

TABLE 1

| Script | Aesthetic | Aesthetic + Fidelity | RT2A | Human director |
|---|---|---|---|---|
| 1 | 32 (33%) | 35 (46%) | 27 (13%) | 24 |
| 2 | 50 (150%) | 43 (115%) | 28 (40%) | 20 |
| 3 | 45 (95%) | 40 (74%) | 31 (40%) | 23 |
| 4 | 37 (146%) | 39 (160%) | 21 (35%) | 15 |
| 5 | 15 (150%) | 13 (116%) | 8 (33%) | 6 |

In the following, how the reference model can achieve the similar visual results by adding the corresponding cost functions or adjusting weights is demonstrated. The data-driven RT2A method has the advantage over manually crafting many rules.

Figure 6:
FIG. 6 illustrates exemplary establishing shot frames generated by the aesthetic model (left) and the RT2A model (right)
Figure 6:

It is common to begin each new scene with a wide shot. The function becomes specifically to establish an overall perspective and then cut into specific segments. A wide-angle shot as the establishing shot is used to set a particular tone and mood for what the audience is about to see. FIG. 6 illustrates exemplary establishing shot frames generated by the aesthetic model (left) and the RT2A model (right). As shown in FIG. 6, compared to the reference method, the RT2A method learns the lens language better and uses the establishing shot at the beginning of the scene. It is possible if the reference algorithm desires to achieve a similar outcome, that is, a new cost function for determining whether the first few frames need to be included in the optimization framework, and the characters captured by the LS shot are required to occupy the least space in the frame compared to other shot type. Thus, the weight of the character visibility in the cost function needs to be minimized.

Figure 7:
FIG. 7 illustrates exemplary dialogue frames generated by the aesthetic model (left) and the RT2A model (right)
Figure 7:

The over the shoulder shot is widely used in the dialogue scene for the audience to understand the relationship between the characters and to convey a dramatic tension on the viewers. It is used to assemble a reverse shot in the dialogue scene. FIG. 7 illustrates exemplary dialogue frames generated by the aesthetic model (left) and the RT2A model (right). As shown in FIG. 7, the RT2A method learns the lens language successfully and uses the over the shoulder shot in the dialogue scene. To achieve a similar result by the reference method, a new cost function needs to be added to determine whether there is enough duration for the dialogue action to switch between shots. In addition, the weight of the camera placement used to take the over the shoulder shot needs to be modified during the optimization process, to loosen the requirement of capturing actions from behind the character.

Figure 8:
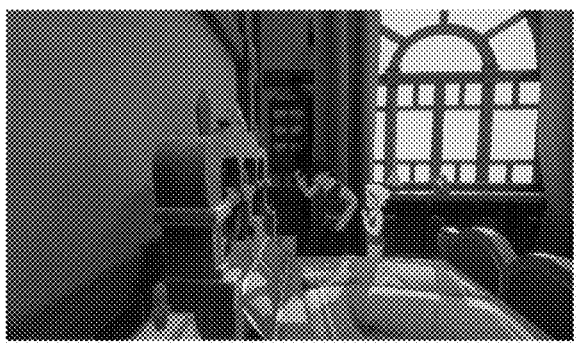
FIG. 8 illustrates exemplary single action frames generated by the aesthetic model (left) and the RT2A model (right).
Figure 8:

Some actions of particular characters need to be shot from a close distance and at an appropriate angle for the audience to better understand the content. FIG. 8 illustrates exemplary single action frames generated by the aesthetic model (left) and the RT2A model (right). As shown in FIG. 8, the frames captured by the camera in the reference model does not properly illustrate the actions of "inspect the item". To make the aesthetic model method achieve a similar result, it is required to manually modify the weights of different camera configuration for specific actions according to the interpretation of the story.

In the embodiments of the present disclosure, the creativity and imagination demonstrated by the use of the lens language in the film-making process requires tremendous professional knowledge and talent. It would benefit entry-level artist if the automatic cinematography algorithm can learn from the professional directors and thus mimic the lens languages used in the successful films. However, a major obstacle to achieve this is that there is insufficient amount of accurate training data. The RT2A framework produces accurate data for training the automatic cinematography system with the support of the human directors. Through learning the lens language from the human directors, the RT2A method is able to select the right shot type and right camera angle for the automatic cinematography process.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A script-to-movie generation method, comprising:
obtaining a movie script;
generating a list of actions according to the movie script;
generating stage performance based on each action in the list of actions;
extracting observation information from the stage performance;
using a camera agent trained with a reinforcement learning algorithm to select a camera based on the observation information and a policy for camera selection, wherein the camera includes camera setting that defines a position of the camera with respect to a character for which the camera shoots, and the policy for camera selection is initially pre-configured and is iteratively updated by the reinforcement learning algorithm;
evaluating quality of the camera selected by the camera agent;
in response to the quality of the camera selected by the camera agent being lower than or equal to a pre-configured threshold, changing the camera selected by the camera agent according to a camera selection input entered by a human through a graphical user interface; and
using the camera according to the camera selection input by the human as ground truth data to train the camera agent and update the policy for camera selection;
using the camera selected by the camera agent or by the camera selection input by the human to capture a video of the stage performance; and
outputting the video.

2. The method according to claim 1, wherein updating the policy for camera selection includes:
using a reward function to calculate a reward based on the camera selected by the camera agent and the camera selected by the camera selection input by the human; and
using the reward to update the policy for camera selection.

3. The method according to claim 2, wherein the camera setting of the camera includes:
a shot type d(c) representing a distance between the camera and a shooting character, wherein c denotes a camera, and $d(c) \in [0, 1, 2, 3, 4]$ representing the shot type of the camera is selected from extreme close shot, close shot, median shot, full body shot, and long shot;
a pan angle h(c) that ranges from 0° to 360°; and
a pitch angle p(c) that ranges from −15° to 15°.

4. The method according to claim 3, wherein:
the reward function includes a reward function for the shot type, a reward function for the pan angle, a reward function for the pitch angle, and an extra reward;
the reward function for the shot type is $$r_t^d = \begin{cases} 1 & \text{if } d(c_t^i) = d(gc_t) \\ 1 - \frac{|d(c_t^i) - d(gc_t)|}{4} & \text{otherwise} \end{cases};$$

the reward function for the pan angle is $$r_t^h = \begin{cases} 1 & \text{if } h(c_t^i) = h(gc_t) \\ 1 - \frac{|h(c_t^i) - h(gc_t)|}{30} & \text{otherwise} \end{cases};$$

the reward function for the pitch angle is $$r_t^p = \begin{cases} 1 & \text{if } p(c_t^i) = p(gc_t) \\ 1 - \frac{|p(c_t^i) - p(gc_t)|}{180} & \text{otherwise} \end{cases};$$

the extra reward is $$r_t^\delta = \begin{cases} 1 & \text{if } \frac{|d(c_t^i) - d(gc_t)|}{4} + \frac{|h(c_t^i) - h(gc_t)|}{30} + \frac{|p(c_t^i) - p(gc_t)|}{180} < \delta \\ 0 & \text{otherwise} \end{cases};$$

and
$C_t^i$ the camera selected by the camera agent at a time t, i is an index of the camera selected by the camera agent, $gc_t$ is the camera selected by the camera selection input by the human at the time t, and δ is the pre-configured threshold.

5. The method according to claim 2, wherein using the reward to update the policy for camera selection comprises: using the reward for an episode with T steps $$\mathcal{R} = \sum_0^T \gamma^{t-1} r_t \; t = 0, 1, \cdots, T$$

to update the policy for camera selection, wherein $r_t$ is the reward at time t, $\gamma$ is a discount factor that defines importance of the reward $r_t$ versus a future reward, and $0 \leq \gamma \leq 1$.

6. The method according to claim 5, further comprising: finding an optimal policy for camera selection $\pi^*$ that maximizes the reward R for the episode with T steps.

7. The method according to claim 6, wherein: finding the optimal policy for camera selection $\pi^*$ includes iteratively updating parameters of the policy for camera selection $\pi$ according to a loss function L that measures an error between a reward estimation calculated by using a current policy for camera selection $\pi_{current}$ and a previous policy for camera selection $\pi_{previous}$ by using a proximal policy optimization (PPO) algorithm.

8. The method according to claim 7, wherein: an improvement between the current policy for camera selection $\pi_{current}$ and the previous policy for camera selection $\pi_{previous}$ is evaluated by calculating an advantage $\hat{A}$ at time t:

$$\hat{A} = -V(o_t) + rt_t + \gamma r_{t+1} + \ldots + \gamma^{T-t+1} rt_{T-1} + \gamma^{T-t} V(o_t),$$

wherein V is a learned state-value function, $o_t$ is the observation information at time t, and $rt_t$ is a parameter changing ratio between the current policy for camera selection $\pi_{current}$ and the previous policy for camera selection $\pi_{previous}$ at time t.

9. The method according to claim 8, wherein: the PPO algorithm updates parameters of both actor and critic neural networks through back-propagation according to two loss functions below:

$$L_{actor}(\theta) = \min(rt(\theta)\hat{A}_t, clip(rt(\theta), 1-\epsilon, 1+\epsilon)\hat{A}_t) \text{ and } L_{critic} = \frac{1}{2}\hat{A}_t^2;$$

wherein $\theta$ indicates whether it is the current policy for camera selection or the previous policy for camera selection, clip(•) modifies a surrogate objective by clipping a probability ratio which removes an incentive for moving rt outside of an interval $[1-\epsilon, 1+\epsilon]$.

10. The method according to claim 1, wherein: the observation information includes character visibility, camera configuration, left to right order, action type, action start time and duration, dialogue start time and duration, or a combination thereof.

11. The method according to claim 3, wherein the reward function is determined based on a difference between the camera setting of the camera selected by the camera agent and the camera setting of the camera selected by the camera selection input by the human, and the reward is higher when the difference is smaller.

12. The method according to claim 11, wherein when the difference between the camera selected by the camera agent and the camera selected by the camera selection input by the human is less than the predefined threshold $\delta$, an extra reward is added to the reward function to expedite training of the camera agent.

13. A script-to-movie generation system, comprising:
a memory storing program instructions; and
a processor coupled with the memory and configured to execute the program instructions to:
obtain a movie script;
generate a list of actions according to the movie script;
generate stage performance based on each action in the list of actions;
extract observation information from the stage performance;
use a camera agent trained with a reinforcement learning algorithm to select a camera based on the observation information and a policy for camera selection, wherein the camera includes camera setting that defines a position of the camera with respect to a character for which the camera shoots, and the policy for camera selection is initially pre-configured and is iteratively updated by the reinforcement learning algorithm;
evaluating quality of the camera selected by the camera agent;
in response to the quality of the camera selected by the camera agent being lower than or equal to a pre-configured threshold, changing the camera selected by the camera agent according to a camera selection input entered by a human through a graphical user interface; and
using the camera according to the camera selection input by the human as ground truth data to train the camera agent and update the policy for camera selection;
use the camera selected by the camera agent or by the camera selection input by the human to capture a video of the stage performance; and
output the video.

14. The system according to claim 13, wherein when updating the policy for camera selection, the processor is further configured to:
use a reward function to calculate a reward based on the camera selected by the camera agent and the camera selected by the camera selection input by the human; and
use the reward to update the policy for camera selection.

15. The system according to claim 14, wherein the camera setting of the camera includes:
a shot type d(c) representing a distance between the camera and a shooting character, wherein c denotes a camera, and $d(c) \in [0, 1, 2, 3, 4]$ representing the shot type of the camera is selected from extreme close shot, close shot, median shot, full body shot, and long shot;
a pan angle h(c) that ranges from 0° to 360°; and
a pitch angle p(c) that ranges from −15° to 15°.

16. The system according to claim 15, wherein:
the reward function includes a reward function for the shot type, a reward function for the pan angle, a reward function for the pitch angle, and an extra reward;
the reward function for the shot type is $$r_t^d = \begin{cases} 1 & \text{if } d(c_t^i) = d(gc_t) \\ 1 - \frac{|d(c_t^i) - d(gc_t)|}{4} & \text{otherwise} \end{cases};$$

the reward function for the pan angle is $$r_t^h = \begin{cases} 1 & \text{if } h(c_t^i) = h(gc_t) \\ 1 - \frac{|h(c_t^i) - h(gc_t)|}{30} & \text{otherwise} \end{cases};$$

the reward function for the pitch angle is $$r_t^p = \begin{cases} 1 & \text{if } p(c_t^i) = p(gc_t) \\ 1 - \dfrac{|p(c_t^i) - p(gc_t)|}{180} & \text{otherwise} \end{cases} ;$$

the extra reward is $$r_t^\delta = \begin{cases} 1 & \text{if } \dfrac{|d(c_t^i) - d(gc_t)|}{4} + \dfrac{|h(c_t^i) - h(gc_t)|}{30} + \dfrac{|p(c_t^i) - p(gc_t)|}{180} < \delta \\ 0 & \text{otherwise} \end{cases} ;$$

and $C_t^i$ is the camera selected by the camera agent at a time t, i is an index of the camera selected by the camera agent, $gc_t$ is the camera selected by the camera selection input by the human at the time t, and $\delta$ is the pre-configured threshold.

17. The system according to claim 14, wherein when using the reward to update the policy for camera selection, the processor is further configured to:

use the reward for an episode with T steps $$\mathcal{R} = \sum_0^T \gamma^{t-1} r_t \quad t = 0, 1, \cdots, T$$

to update the policy for camera selection, wherein $r_t$ is the reward at time t, $\gamma$ is a discount factor that defines importance of the reward $r_t$ versus a future reward, and $0 \leq \gamma \leq 1$.

18. The system according to claim 17, wherein the processor is further configured to:
find an optimal policy for camera selection $\pi^*$ that maximizes the reward R for the episode with T steps.

19. The system according to claim 15, wherein the reward function is determined based on a difference between the camera setting of the camera selected by the camera agent and the camera setting of the camera selected by the camera selection input by the human, and the reward is higher when the difference is smaller.

20. The system according to claim 19, wherein when the difference between the camera selected by the camera agent and the camera selected by the camera selection input by the human is less than the predefined threshold $\delta$, an extra reward is added to the reward function to expedite training of the camera agent.

* * * * *